United States Patent [19]
Folsom

[11] Patent Number: 5,486,142
[45] Date of Patent: Jan. 23, 1996

[54] HYDROSTATIC TRANSMISSION INCLUDING A SIMPLIFIED RATIO CONTROLLER

[75] Inventor: Lawrence R. Folsom, Pittsfield, Mass.

[73] Assignee: Martin Marietta Corporation, King of Prussia, Pa.

[21] Appl. No.: 342,472

[22] Filed: Nov. 21, 1994

[51] Int. Cl.$^6$ .............................. F16H 61/00; F16D 31/02
[52] U.S. Cl. ................................................ 474/69; 60/492
[58] Field of Search .......................... 474/69, 70; 60/413, 60/492, 491, 488, 490, 499, 500, 505; 91/499–506; 92/12.2, 71

[56] References Cited

U.S. PATENT DOCUMENTS

| | | | |
|---|---|---|---|
| 2,832,198 | 4/1958 | Pichon | 60/492 |
| 3,204,411 | 9/1965 | Stockton | 60/492 |
| 4,493,189 | 1/1985 | Slater | 60/492 X |
| 4,495,768 | 1/1985 | Valavaara | 60/488 X |
| 5,423,183 | 6/1995 | Folsom | 60/492 |

*Primary Examiner*—Michael Powell Buiz
*Attorney, Agent, or Firm*—Robert A. Cahill; Geoffrey H. Krauss

[57] ABSTRACT

A continuously variable hydrostatic transmission includes an input shaft connected to drive a hydraulic pump unit, a grounded hydraulic motor unit, and an output shaft. A wedge-shaped swashplate is pivotally mounted to the output shaft in driving connection to receive output torque resulting from the exchange of pressurized hydraulic fluid between the pump and motor units through specially configured ports in the swashplate. A hydraulically actuated ratio controller shifts the axial positions of spherical bearings mounting a pump cylinder block in the hydraulic pump unit and a motor cylinder block in the hydraulic motor unit to adjust the swashplate angle relative to the output shaft axis and thereby change transmission ratio.

20 Claims, 7 Drawing Sheets

5,486,142

HYDROSTATIC TRANSMISSION INCLUDING A SIMPLIFIED RATIO CONTROLLER

REFERENCE TO RELATED APPLICATIONS

This application is related to my U.S. patent application Ser. No. 08/043,192, filed Jul. 13, 1993 entitled "Hydraulic Machine", now U.S. Pat. No. 5,423,183, issued Jun. 13, 1995 and my application entitled "Continuously Variable Hydrostatic Transmission", Ser. No 08/333,688, filed Nov. 3, 1994. The disclosures of these related copending applications are incorporated herein by reference.

FIELD OF THE INVENTION

The present invention relates to hydraulic machines and, more particularly, to hydrostatic transmissions capable of transmitting power from a prime mover to a load at continuously (infinitely) variable transmission ratios.

BACKGROUND OF THE INVENTION

In my cited U.S. application, a hydraulic machine is disclosed as including a hydraulic pump unit and a hydraulic motor unit positioned in opposed, axially aligned relation with an intermediate, wedge-shaped swashplate. The pump unit is connected to an input shaft driven by a prime mover, while the motor unit is grounded to the stationary machine housing. An output shaft, coaxial with the input shaft and drivingly coupled to a load, is connected to the swashplate. When the pump unit is driven by the prime mover, hydraulic fluid is pumped back and forth between the pump and motor units through specially configured ports in the swashplate. As a result, three torque components, all acting in the same direction, are exerted on the swashplate to produce output torque on the output shaft for driving the load. Two of these torque components are a mechanical component exerted on the swashplate by the rotating pump unit and a hydromechanical component exerted on the swashplate by the motor unit. The third component is a pure hydrostatic component resulting from the differential forces created by the fluid pressures acting on circumferentially opposed end surfaces of the swashplate ports, which are of different surface areas due to the wedge shape of the swashplate.

To change transmission ratio, the angular orientation of the swashplate relative to the axis of the output shaft is varied. Since the transmission ratio, i.e., speed ratio, is continuously variable between 1:0 and 1:1, the prime mover can run at a constant speed set essentially at its most efficient operating point. The availability of a 1:0 (neutral) transmission ratio setting eliminates the need for a clutch. Unlike conventional, continuously variable hydrostatic transmissions, wherein hydraulic fluid flow rate increases proportionately with increasing transmission ratio such that maximum flow rate occurs at the highest transmission ratio setting, the flow rate in the hydraulic machine disclosed in my cited U.S. application reaches a maximum at a midpoint in the ratio range and then progressively decreases to essentially zero at the highest transmission ratio setting. Thus, losses due to hydraulic fluid flow are reduced, and the annoying whine of conventional hydrostatic transmissions at high ratios is avoided. By virtue of the multiple torque components exerted on the swashplate, the decreasing hydraulic fluid flow in the upper half of the output speed range, and the capability of accommodating an optimum performance prime mover input, the hydraulic machine of my PCT application has a particularly advantageous application as a highly efficient, quiet, continuously variable hydrostatic transmission in vehicular drive trains.

SUMMARY OF THE INVENTION

An objective of the present invention is to provide improvements in the hydraulic machine of my application Ser. No. 08/093,192, to achieve economies in size, parts count and manufacturing cost.

A further objective of the present invention is to provide improvements in the provisions for accommodating high and low pressure hydraulic fluid flows within the machine and the manner in which transmission ratio is changed, i.e., adjustment of swashplate angle.

To achieve these objectives, the hydraulic machine of the present invention, in its application as a continuously variable hydrostatic transmission, comprises a housing; an input shaft journaled in the housing for receiving input torque from a prime mover; an output shaft journaled in housing for imparting driving torque to a load; a hydraulic pump unit including a first carrier driven by the input shaft and mounting an annular array of pump pistons, a first cylinder block providing an annular array of pump cylinders for respectively receiving the pump pistons, and a first spherical bearing mounting the first cylinder block relative to the first carrier; a hydraulic motor unit including a second carrier fixed to the housing and mounting an annular array of motor pistons, a second cylinder block providing an annular array of motor cylinders for respectively receiving the motor pistons, and a second spherical bearing mounting the second cylinder block relative to the second carrier; a wedge-shaped swashplate including ports extending between an input face confronting the pump unit and an output face confronting the motor unit; a connector pivotally coupling the swashplate to the output shaft in torque-coupled relation; and a ratio controller selectively exerting coordinated axial forces on the first and second cylinder blocks to adjustably set an angle of the swashplate relative to an axis of the output shaft according to a desired transmission ratio.

Additional features, advantages, and objectives of the invention will be set forth in the description which follows and in part will be apparent from the description, or may be learned by practice of the invention. The objectives and advantages of the present invention will be realized and attained by the apparatus particularly pointed out in the following written description and the appended claims, as well as in the accompanying drawings.

It will be understood that both the foregoing general description and the following detailed description are exemplary and explanatory and are intended to provide further explanation of the invention as claimed.

The accompanying drawings are intended to provide a further understanding of the invention and are incorporated in and constitute a part of the specification, illustrate a preferred embodiment of the invention and, together with the description, serve to explain the principles of the invention.

3

Figure 1:
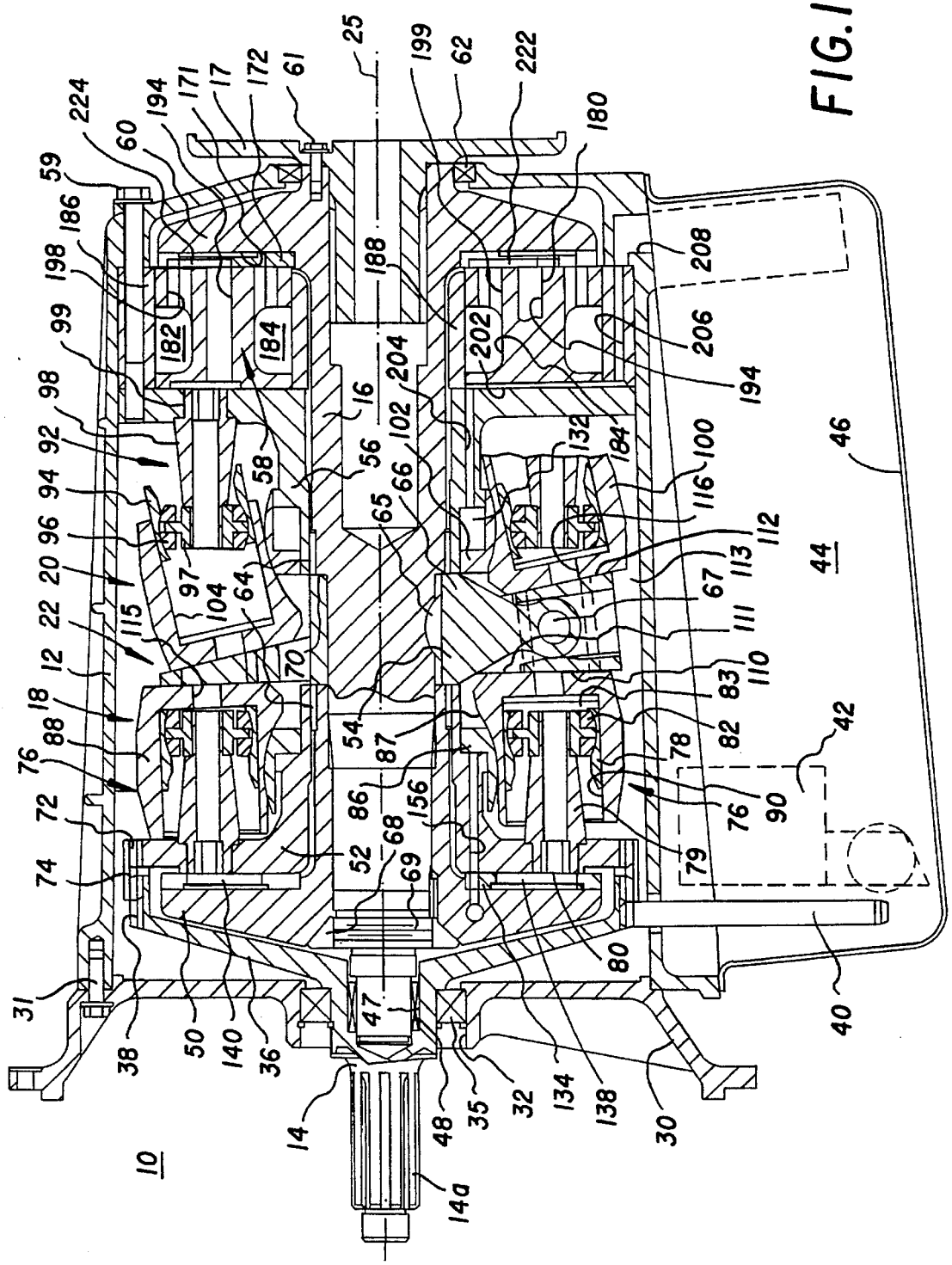
FIG. 1 is a longitudinal sectional view of a continuously variable hydrostatic transmission, in accordance with the present invention, illustrated in one transmission ratio setting.
Figure 2:
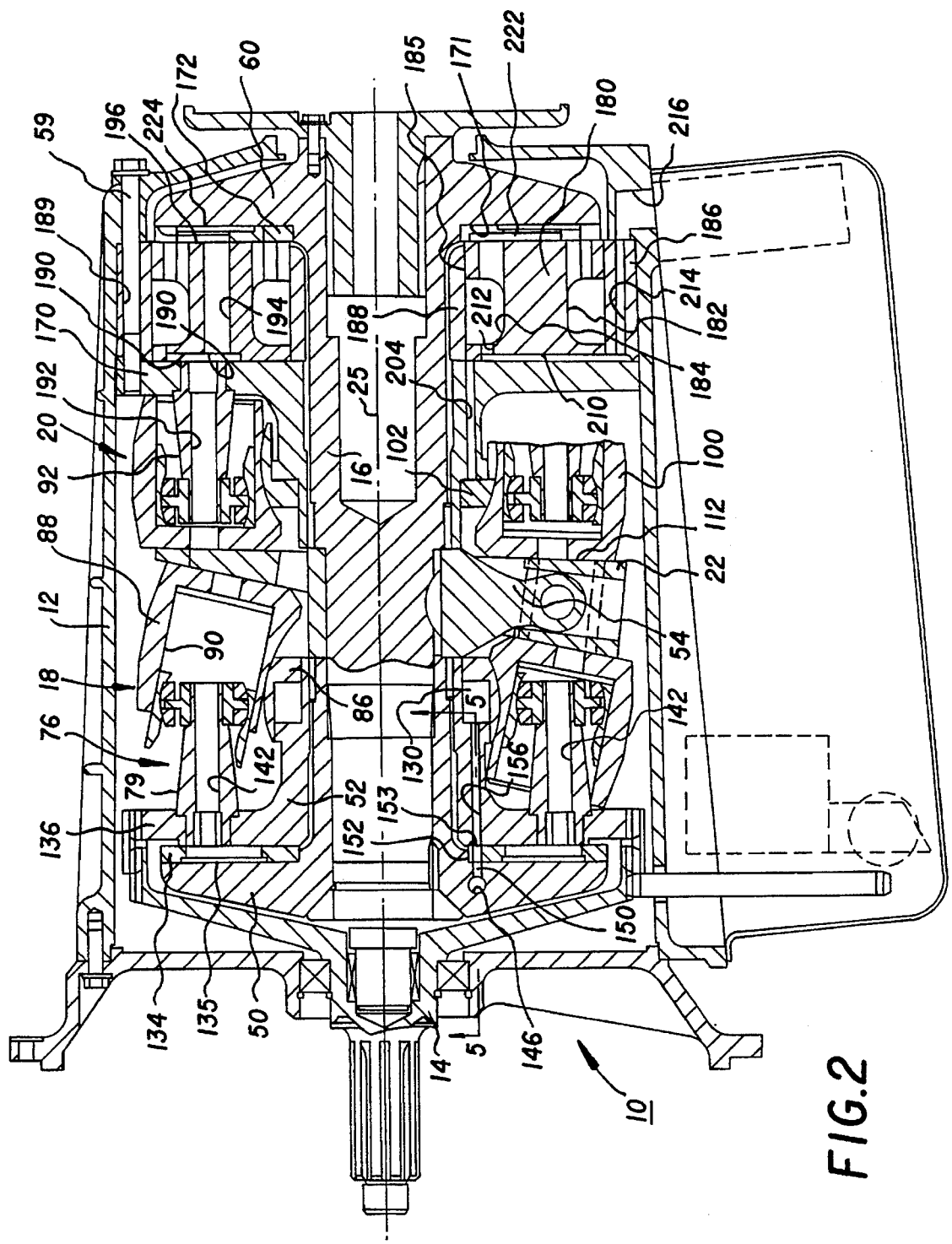
FIG. 2 is a longitudinal sectional view corresponding to FIG. 1, illustrating the transmission in a different ratio setting.
Figure 3:
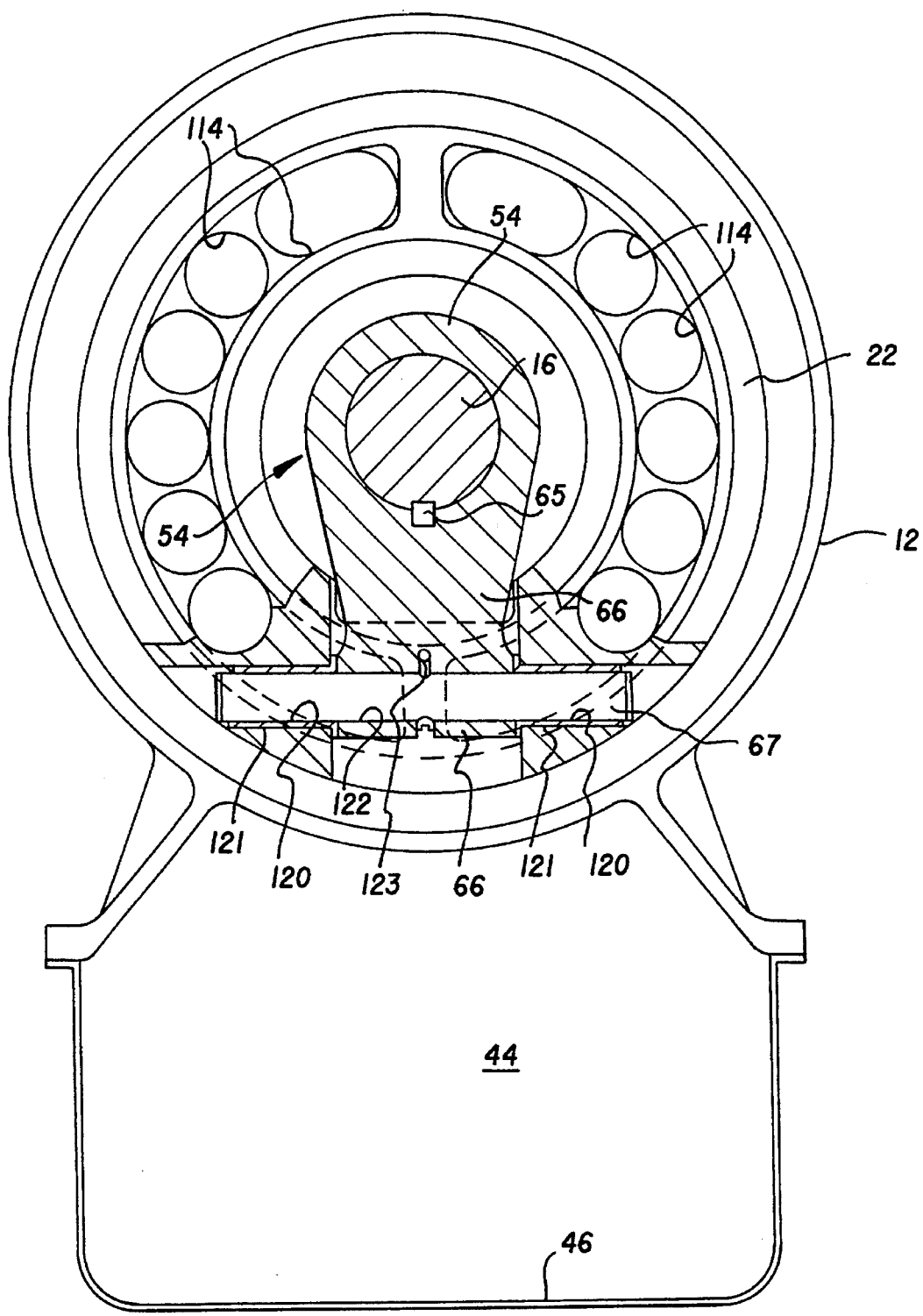
Figure 9:
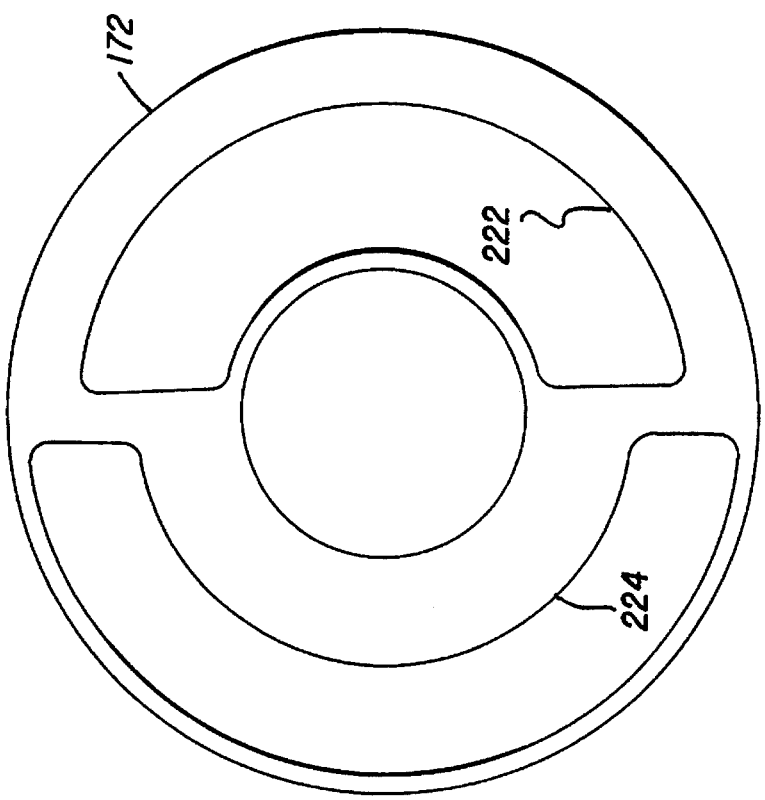
Figure 4:
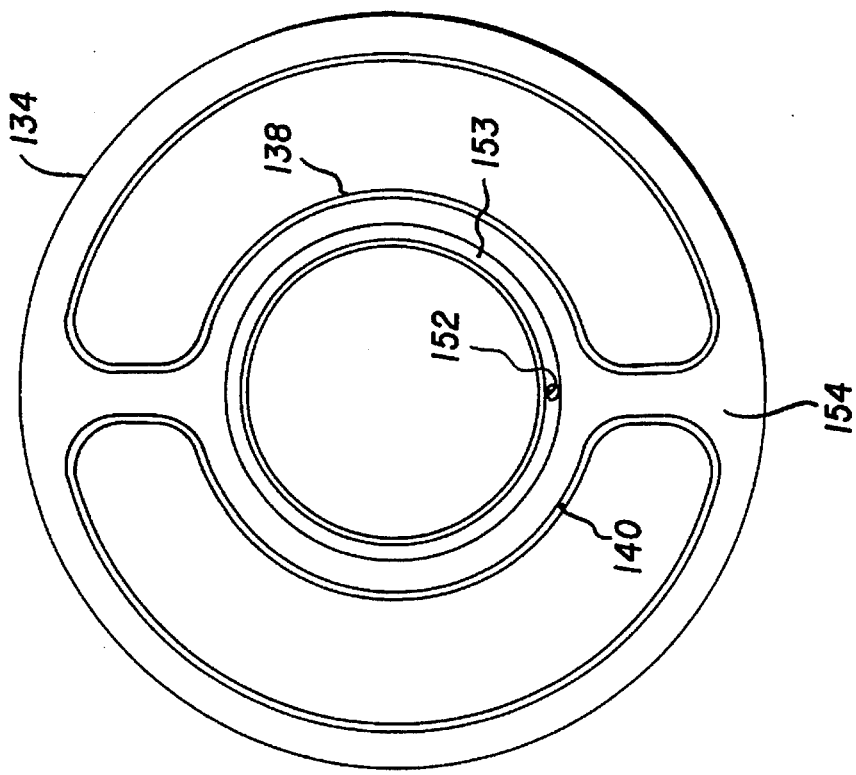
Figure 8:
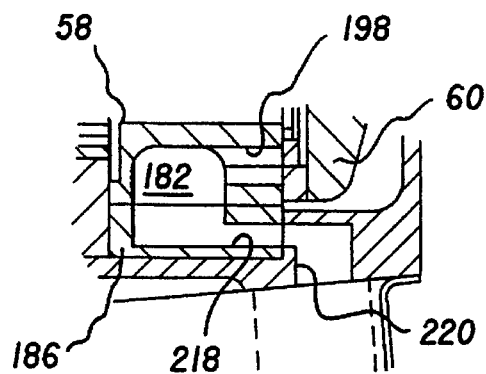
Figure 5:
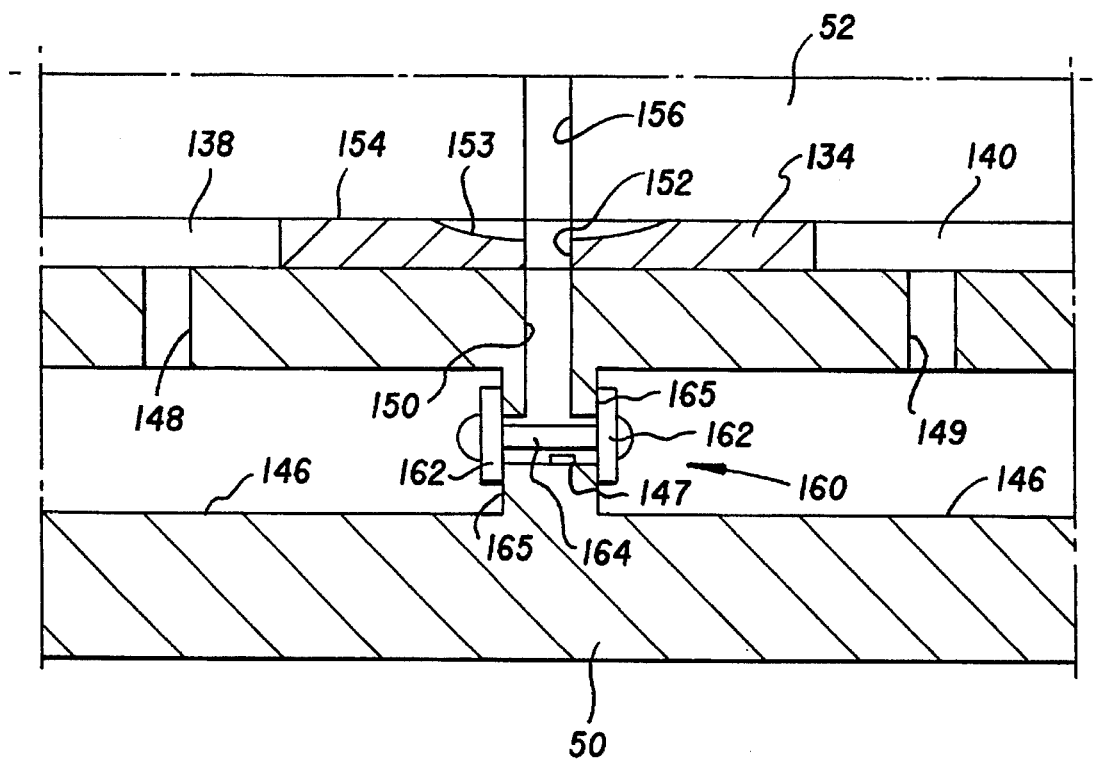
Figure 7:
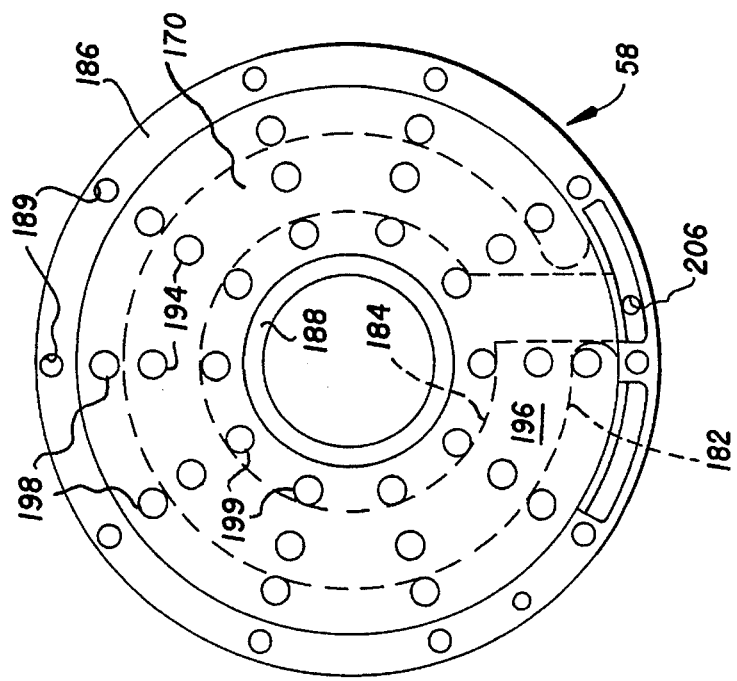
Figure 6:
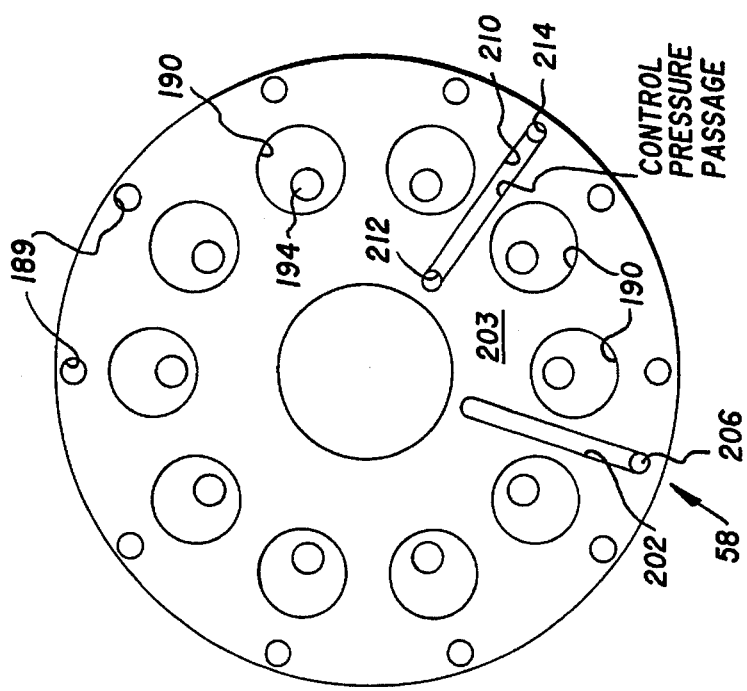
Figure 10:
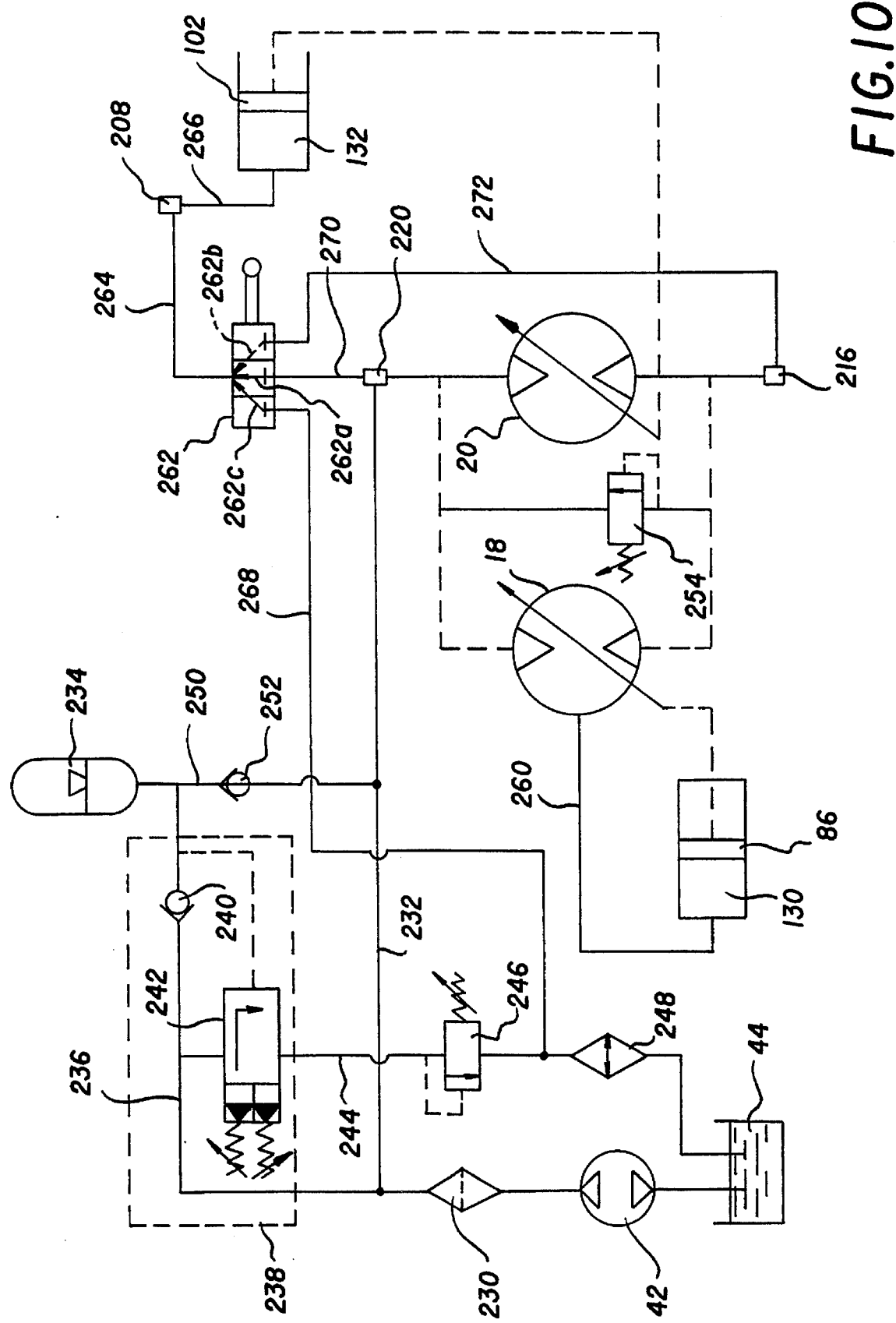

FIG. 3 is a side elevational view of a swashplate utilized in the transmission of FIG. 1;

FIG. 4 is a side elevational view of an input portplate utilized in the transmission of FIG. 1;

FIG. 5 is a fragmentary sectional view taken along line 5—5 of FIG. 2;

FIGS. 6 and 7 are opposite side elevational views of a manifold block utilized in the transmission of FIG. 1;

FIG. 8 is a fragmentary sectional view illustrating the fluid connection between a low pressure cavity in the manifold block of FIGS. 6 and 7 and a low pressure housing port in the transmission of FIG. 1;

FIG. 9 is a side elevational view of an output portplate utilized in the transmission of FIG. 1; and FIG. 10 is a schematic diagram of a hydraulic circuit incorporating the transmission of FIG. 1.

Corresponding reference numerals refer to like parts throughout the several views of the drawings.

DETAILED DESCRIPTION OF THE PREFERRED EMBODIMENT

The continuously variable hydrostatic transmission according to the preferred embodiment of the present invention, generally indicated at 10 in FIG. 1, comprises, as basic components, a housing 12 in which are journaled an input shaft 14 and an output shaft 16 in coaxial, generally end-to-end relation. The end of input shaft 14 external to the housing is splined, as indicated at 14a, to facilitate driving connection to a prime mover (not shown), while the outer end of output shaft 16 is equipped with a coupling 17 to facilitate driving connection to a load (not shown). Input shaft 14 drives a hydraulic pump unit, generally indicated at 18. A hydraulic motor unit, generally indicated at 20, is grounded to housing 12 in axially opposed relation to pump unit 18. A wedge-shaped swashplate, generally indicated at 22, is drivingly connected to the output shaft 16 in a position between the pump and motor units and is ported to provide for the exchange of hydraulic fluid between the pump and motor units. A controller, comprised of elements schematically illustrated in the hydraulic circuit of FIG. 10, acts to pivotally adjust the angle of swashplate orientation relative to the output shaft axis 25, thereby setting the transmission ratio of the input shaft speed to the output shaft speed.

Now referring to FIG. 1 in greater detail, the cylindrical housing 12 includes a cover 30 secured in place by an annular array of bolts, one seen at 31, to close off the open input end of the housing. Input shaft 14 extends into housing 12 through a central opening 32 in the cover. Bearings 35, fitted in cover opening 32 journal the input shaft 14 for rotation. Seals (not shown) are included in the cover opening 32 in sealing relation with the input shaft peripheral surface to prevent leakage of hydraulic fluid.

The input shaft 14 is radially flared to provide a bell mouth-shaped inner termination 36 just inside of cover 30. The peripheral surface of this input shaft termination is machined with teeth to provide a spur gear 38 meshed with a spur gear 40, in turn, connected to drive a scavenge pump 42 positioned in a sump 44 provided by a lower pan 46 affixed to housing 12. The inner end of input shaft 14 is counterbored to provide a cylindrical recess 47 for receiving a reduced diameter inner terminal portion of output shaft 16. Bearings 48, fitted in recess 47, provide inner end journal support for the output shaft. Assembled on output shaft 16 are an annular inner endpiece 50, an annular pump piston carrier 52, a swashplate coupling 54, an annular motor piston carrier 56, and an annular manifold block 58. The motor piston carrier and manifold block are grounded to housing 12 by bolts, one seen at 59. The output shaft is terminated by an integral endpiece 60 to which coupling 17 is affixed by bolts, one seen at 61. A ring bearing 62, fitted in an output opening of housing 12, provides output end journal support for the output shaft. Bearings 64 positioned between the output shaft 16 and pump piston carrier 52 and between the output shaft and the motor piston carrier 56 provide journal support for these carriers as the output shaft rotates relative thereto. Swashplate coupling 54 is keyed to the output shaft, as indicated at 65, and incudes a radially extending arm 66 having a hole in which a pin 67 is received to pivotally and drivingly connect the swashplate 22 to the output shaft 16. A nut 68 is threaded on an axial threaded section 69 of the output shaft to clamp endpiece 50 and swashplate coupling 54 against a shoulder 70 machined into the output shaft, such that endpiece 50 rotates in unison with the output shaft and the swashplate coupling.

Still referring to FIG. 1, a peripheral surface of the pump piston carrier 52 is machined with gear teeth 72 which mesh with an annular gear 74, as do the gear teeth 38 on input shaft termination 36, and thus the pump piston carrier 52 is drivingly coupled to input shaft 14. The pump piston carrier supports a plurality of pistons included in hydraulic pump unit 18. These pistons, for example, ten in number with two being generally indicated at 76, are uniformly distributed in a circular array concentric with output shaft axis 25 in the manner disclosed in my PCT application. As illustrated in FIG. 1 herein, each pump piston 76 includes a piston head 78 mounted to the piston carrier 52 by an axially extending post 79 threaded into a tapped hole 80 in the piston carrier. Piston head 78 is machined to provide a spherical inner surface conforming to a spherical outer surface of an outer annular bearing 82 keyed on an inner bushing 83 carried on the shoulder free end of post 79. As a result, each piston head 78 is mounted for limited swiveling and radial motion, as in the case of the hydraulic machine disclosed in my cited U.S. application.

The cylindrical right end portion of pump piston carrier 52 carries an annular spherical bearing 86 conforming to a spherical surface 87 machined in the central opening of an annular pump cylinder block 88. Cylinder block 88 includes an annular array of pump cylinders 90 for respectively receiving the pump pistons 76. By virtue of the spherical bearing mountings of pump piston heads 78 and pump cylinder block 88, precessing motion of the pump cylinder block rotational axis is accommodated.

Still referring to FIG. 1, hydraulic motor unit 20 is constructed in essentially the same manner as hydraulic pump unit 18. However, as noted above, annular motor piston carrier 56, corresponding to pump piston carrier 52, is grounded to housing 12 by bolts 59. Each of a plurality of motor pistons, generally indicated at 92 and corresponding in number to the pump pistons 76, includes a piston head 94 swivel mounted on a spherical bearing 96 and bushing 97 carried on the shouldered free end of a post 98 threaded into a tapped bore 99 in motor piston carrier 56 in the same manner as the pump pistons. A motor cylinder block 100 is then swivel mounted on motor piston carrier via an annular spherical bearing 102. Again, as in the case of pump cylinder block 88, a circular array of motor cylinders 104 are formed in motor cylinder block 100 to respectively receive the motor pistons 92, Since motor unit 20 is grounded to the housing 12, the motor pistons 92 and cylinder block 100 do not rotate, however, the spherical bearing mountings of motor piston heads 94 to posts 98 and motor cylinder block 100 to carrier 56 accommodate nutating (precessing) motion of the motor cylinder block axis, Swashplate 22 is drivingly connected to output shaft 16 by coupling 54 in operative position between pump unit 18 and motor unit 20, with an input face 110 in intimate sliding contact with face 111 of pump cylinder block 88 and an output face 112 in intimate sliding contact with face 113 of motor cylinder block 100. The input and output faces of swashplate 22 are relatively oriented at an acute angle to provide the wedge shape of the swashplate. Ports 114, seen in FIG. 3, extend between the input and output faces of the swashplate and communicate with respective openings 115 into cylinders 90 of pump cylinder block 88 and respective openings 116 into the cylinders 104 of motor cylinder block 100, all as more fully described and illustrated in my cited PCT application.

FIG. 3 also illustrates the pivotal, driving connection of swashplate 22 to output shaft 16 afforded by coupling 54 mentioned above with regard to FIG. 1. Transversely aligned transverse bores 120 are drilled through an axially thickened rim of swashplate 22 and lined with bushings 121. Pivot pin 67 is then inserted through bushings 121 and hole 122 in arm 66 to the position shown in FIG. 3, a position fixed by a set screw 123. In accordance with a feature of the present invention, the radial length of arm 66 is such that the radial offset of the transverse axis of pivot pin 67 is substantially equal to the radii (relative to output shaft axis 25) of the circle arrays of pump pistons 76 and motor pistons 92. This feature permits reductions in the overall length of transmission 10 and the axial forces required to change the swashplate angle relative to the output shaft axis 25, i.e., transmission ratio, as described below.

While not shown, material is selectively removed from annular endpieces 50 and 60 to counterbalance the eccentric masses of the precessing swashplate 22, pump cylinder block 88, and motor cylinder block 100, so as to serve the purpose of the separate balance ring described in detail in my cited U.S. application.

As also described in my cited U.S. application, transmission ratio (input shaft speed verses output shaft speed) is changed by adjusting the angular orientation of swashplate 22 relative to the output shaft axis 25. When the input face 110 of the swashplate is perpendicular to the output shaft axis, the axis of pump cylinder block 88 is coincident with the output shaft axis. Consequently, driven rotation of the pump cylinder block about its axis is without an axial component of motion, and therefore no pumping action of hydraulic fluid by pump unit 18 occurs. This is the neutral setting of transmission 10. At the swashplate angle illustrated in FIG. 1, input face 110 of the swashplate is at a slight angle in the counterclockwise direction from perpendicular to the output shaft axis, and consequently the axis of pump cylinder block 88 is precessed to a corresponding slight angle relative to the output shaft axis. Now, rotation of the pump cylinder block 88 includes an axial component of motion, and consequently hydraulic fluid is pumped by pump unit 18. The swashplate angle illustrated in FIG. 1 is a reverse setting, wherein the output shaft 16 turns at a slow speed in a direction opposite (reverse) to the input shaft.

When the swashplate is pivoted on pin 67 in the clockwise direction from the neutral setting toward the swashplate angle position seen in FIG. 2 the axis of the rotating pump cylinder block 88 precesses through increasing angles relative to the output shaft axis, and the hydraulic pumping action of pump unit 18 also increases. Transmission ratio is thus increased, and the output shaft is driven at increasing forward speeds in the same direction as the input shaft. When the output face 112 of the swashplate 22 is perpendicular to the output shaft axis 25, the axis of the motor cylinder block 100 is in coincident with the output shaft axis. Consequently there is no hydraulic fluid pumping action of motor unit 20. The pump unit 18 and swashplate 22 are then essentially locked up hydraulically with no relative movement between pump cylinder block 88 and the swashplate 22. This is the 1:1 ratio setting of transmission 10. FIG. 2 illustrates swashplate output face 112 at a slight angle clockwise beyond perpendicular to the output shaft 25. At this swashplate angle, an overdrive transmission setting is achieved, wherein the output shaft 16 is driven at a forward speed in excess of the input shaft speed, i.e., an overdrive setting.

In accordance with a feature of the present invention, ratio-changing of the swashplate angle is achieved by exerting coordinated forces on the pump cylinder block 88 and motor cylinder block 100 induced by shifting the axial positions of spherical bearings 86 and 102 that mount the pump cylinder block and motor cylinder block, respectively. To this end, and as seen in FIGS. 1 and 2, spherical bearings 86 and 102 are mounted by their respective pump piston carrier 52 and motor piston carrier 56 for sliding axial movement. As best seen in FIG. 2, pump piston carrier 52 and spherical bearing 86 are provided with axially opposed shoulders which, in conjunction with radially opposed skirt portions of the pump piston carrier and spherical bearing, define an annular chamber 130. Similarly and as best seen in FIG. 1, axially opposed shoulders and radially opposed skirts formed in the motor piston carrier 56 and spherical bearing 102 define an annular chamber 132. In FIG. 1, it is seen that the volume of chamber 132 is in the state of maximal axial expansion, while the volume of chamber 130 in the state of maximal axial contraction. Consequently, spherical bearings 86 and 102 have been jointly shifted to extreme leftward axial positions, as are the pump 88 and motor 100 cylinder blocks carried by these spherical bearings. As the pump and motor cylinder blocks are axially shifted leftward, swashplate 22 is forcibly pivoted in the counterclockwise direction about pivot pin 67 to the angle seen in FIG. 1. To forcibly pivot swashplate 22 clockwise to the swashplate angle seen in FIG. 2, the volume of chamber 130 is axially expanded, as the volume of chamber 132 is axially contracted, to axially shift the spherical bearings 86, 102 and cylinder blocks 88, 100 rightward.

Referring to FIG. 2, to establish a fluid pressure in chamber 130, an annular input portplate 134 is fixed against the radial face 135 of annular endpiece 50 on output shaft 16. Thus, the output shaft and input portplate 134 rotate in unison. A radial flange portion 136 of pump piston carrier 52 bears against the right radial face of portplate 134 as the pump piston carrier, driven by input shaft 14, rotates relative to the input portplate tied to output shaft 16. As seen in FIG. 4, input portplate 134 is provided with a pair of circumferentially elongated, kidney-shaped ports 138 and 140 in diametrically opposed relation. The pump piston mounting post 79 are axially drilled to form through-holes 142 to provide fluid flow communication between the pump cylinders 90 and ports 138 and 140 in input portplate 134. Thus, hydraulic fluid in the pump cylinders flows through holes 142 in the pump piston mounting posts to fill ports 138 and 140 in the input portplate 134. The hydraulic fluid in these ports 138 and 140 is thus pressurized according to the fluid pressures in the pump cylinders 90 as pump unit 18 is driven by input shaft 14. When the pump pistons 76 and pump cylinder 90 revolve from the thinnest point of the wedge-shaped swashplate 22 around to its diametrically opposed thickest point, the volumes of the associated pump cylinders progressively decrease, and the hydraulic fluid in these pump cylinders is therefore being pressurized. This is considered to be the high pressure or pumping side of hydraulic pump unit 18.

When, the pump pistons and pump cylinders revolve from the thickest point around to the thinnest point of the swashplate 22, the volumes of the associated pump cylinders 90 are progressively expanded. This is considered to be the low pressure or suction side of the hydraulic pump unit 18. Since ports 138 and 140 are in fluid communication with the hydraulic fluid in pump cylinders 90 through holes 142 in piston mounting posts 79, the hydraulic fluid in one of these ports is pressurized to a high pressure essentially corresponding to the average fluid pressures of the hydraulic fluid in the pump cylinders involved in the pumping side, and the hydraulic fluid in the other of these ports assumes the average fluid pressure of the hydraulic fluid in the pump cylinders involved in the suction or low pressure side of hydraulic pump unit 18.

Turning to FIG. 5, a pair of opposed transverse bores 146 are drilled in the annular endpiece 50 of output shaft 16 from opposite directions. A smaller diameter bore 147 is drilled through the annular end piece 50 between the inner terminations of bores 146. A longitudinal hole 148 is drilled through endpiece 50 at a radial location to provide fluid communication between port 138 of portplate 134 and one of the bores 146, where a longitudinal bore 149 is drilled through the endpiece at a radial location to provide fluid communication between port 140 and the other bore 146. It will be appreciated that the outer ends of bores 146 are sealed off by plugs (not shown). A third longitudinal bore 150 is drilled into output shaft endpiece 50 at an intersecting location with hole 147 interconnecting bores 146. As also seen in FIGS. 2 and 4, hole 150 is in longitudinal registry with an axial hole 152 through portplate 134, the right end of which opens into an annular cavity 153 machined in the bearing face 154 of the portplate. This annular cavity 153 is closed off by the radial face of pump cylinder carrier 52 in sliding engagement with bearing face 154 of portplate 134. A longitudinal hole 156 is then drilled through pump piston carrier 52 to provide fluid communication between annular cavity 153 and annular chamber 130, as seen in FIGS. 1 and 2.

Still referring to FIG. 5, a shuttle valve 160, operatively positioned in endpiece bores 146, includes a pair of valve plates 162 interconnected in appropriately spaced relation by a shoulder pin 164 extending through hole 147. The shoulders created at the junctions of hole 147 with bores 146 provides valve seats 165 for valve plates 162.

In operation, shuttle valve 160 ensures that only the low pressure side of the hydraulic pump unit is in continuous flow communication with chamber 130. Thus, as illustrated in FIG. 5, port 138 of portplate 134 is on the high pressure side, consequently shuttle valve 160 assumes the position shown to seal off chamber 130 from the high fluid pressure in port 138. The chamber 130 is thus in flow communication with the low fluid pressure port 140 via hole 149, bore 146, holes 147 and 150, annular cavity 153 and hole 156. It will be noted that annular cavity 153 ensures continuous flow communication between portplate hole 152 and piston carrier hole 156 regardless of their relative angular locations. It will be appreciated that, due to torque reversals during acceleration and deceleration, at times port 138 can be on the low pressure side and port 140 on the high pressure side.

Shuttle valve 160 then shifts leftward in FIG. 5 to seal off port 140 from chamber 130 and place port 138 in flow communication with the chamber. Also to be noted is the fact that the hydraulic pressures of the hydraulic fluid in ports 138 and 140 provide a hydrostatic bearing effect for counterbalancing the axial thrust loading generated in transmission 10 and appearing at the sliding interface between portplate 134 and pump piston carrier 52, as described in my cited copending application Ser. No. 08/333,688.

Considering the output end of transmission 10 seen in FIGS. 1 and 2, as previously noted, annular manifold block 58 surrounds output shaft 16 in an axial position between radial flange 170 of motor piston carrier 56 and output endpiece 60 of the output shaft. The radial face 171 of endpiece 60 is recessed to receive an output portplate 172, which is locked in place. Thus output portplate 172 rotates with output shaft 16 while, as noted above, manifold block 58 is stationary, being grounded to housing 12 by bolts 59.

Manifold block 58 includes a cylindrical core 180 with an annular cavity 182 machined in its outer peripheral surface and an annular cavity 184 machined in the surface of its central opening 185. An outer sleeve 186 is press-fitted around the peripheral surface of core 180 to provide a radial seal for outer cavity 182, and an inner sleeve 188 is press-fitted in the core central opening 185 to serve as a radial seal for inner cavity 184. A plurality of bolt holes 189 are drilled in outer ring 186 to receive bolts 59 grounding motor piston carrier 56 and manifold block 58 to the housing. The left face of manifold core 180 is machined to provide an annular array of circular recesses 190 in respective axial alignment with the annular array of motor pistons 92 and in respective flow communication with axial bores 192 in the motor piston mounting posts 98. In the illustrated embodiment hydraulic motor unit 20 includes ten motor pistons 92 equal in number to the number of pump pistons 76, and thus ten recesses 190 are provided in the manifold core 180. As seen in FIGS. 2 and 6, an axial hole 194 is drilled through the manifold core 180 from each recess 190 to the right radial bearing face 196 of manifold block 58 (FIG. 2). Then, as also seen in FIG. 7, radially aligned with each hole 194 is a pair of flanking axial holes 198 and 199 drilled from bearing face 196 into communication with outer annular cavity 182 and inner annular cavity 184, respectively.

Returning to FIG. 6, a radially elongated groove 202 is cut into the left radial face 203 of manifold block 58 at an angular position between an adjacent pair of recesses 190. The inner end of groove 202 communicates with an axial hole 204 drilled through motor piston carrier 56 into communication with annular chamber 132 defined by the motor piston carrier and the spherical bearing 102 (FIG. 1). The outer end of groove 202 communicates with an axial hole 206 drilled through outer sleeve 186 to a port 208 in housing 12, which is connected into the hydraulic circuit of FIG. 10.

Referring jointly to FIGS. 2 and 6, a second radial groove 210 is cut into the left radial face of manifold block 58 and extends between another pair of adjacent recesses 190 from an inner end communicating with an axial hole 212 drilled into inner annular cavity 184 and an outer end communicating with an axial hole 214 drilled through outer sleeve 186 to a second housing port 216. Finally, as seen in the fragmentary view of FIG. 8, an opening 218 is machined in the outer sleeve 176 to provide communication between outer annular cavity 182 and a third housing port 220, angularly spaced from housing ports 208 and 216.

Now considering FIG. 1 in conjunction with FIG. 9, in a manner similar to input portplate 134, a pair of circumferentially elongated, kidney-shaped ports 222 and 224 are provided in output portplate 172. However in the case of output portplate 172, it is seen that ports 222 and 224 are positioned in radially offset relation. Consequently, as seen in FIG. 1, the radially outer port 224 provides fluid communication between manifold through-holes 194 and holes 198 into outer annular cavity 182, while radially inner slot 222 provides fluid communication between manifold through-holes 194 and holes 199 into inner annular cavity 184.

It will be appreciated that since swashplate 22 and output portplate 172 rotate in unison relative to the stationary motor unit 20, portplate 172 provides continuous fluid communication between annular cavity 184 and the motor cylinders 104 (via holes 199 into cavity 184, manifold through-holes 194 and pump piston post bores 192) undergoing volumetric contraction in the pumping (high pressure) side of hydraulic motor unit 20. Similarly, output portplate 172 provides continuous communication between annular cavity 182 and motor cylinders 104 (via holes 198 into cavity 182, manifold through-holes 194, and post bores 192) undergoing volumetric expansion in the suction (low pressure) side of the hydraulic motor unit 20. Thus, the hydraulic fluid in annular cavity 184 assumes a high fluid pressure corresponding to the average fluid pressures in the motor cylinders revolving in the pumping (high pressure) side, and the hydraulic fluid an annular cavity 182 assumes a low fluid pressure corresponding to the average fluid pressures in the motor cylinders revolving in the suction (low pressure) side of the hydraulic motor unit 20. As described above, the high pressure hydraulic fluid in cavity 184 is communicated to housing port 216 (FIG. 2), while the low pressure hydraulic fluid in cavity 182 is communicated to port 220 (FIG. 8).

It will also be noted that, as in the case of input portplate 134, the fluid pressure in ports 212 and 214 of output portplate 172 provide a hydrostatic bearing effect at the interface of the rotating output portplate and manifold block 58 to counterbalance the output end, axial thrust loadings of transmission 10.

Since a detailed description of the operation of transmission 10 may be had by reference to my PCT application, the operating description is merely summarized herein for the sake of brevity. When torque is applied to input shaft 14 by a prime mover, scavenge pump 42 is driven along with pump unit 18 via ring gear 74 to introduce makeup fluid into the pump and motor cylinders 90 and 104 via housing port 220 and the internal fluid passages described above. When the angular position of swashplate input face 110 (FIG. 1) is essentially perpendicular to output shaft axis 25, pump cylinder block 88 turns in a circular path with no axial component of motion, and therefore no pumping of hydraulic fluid occurs. This is the neutral setting of the transmission ratio, as noted above.

When it is desired to apply torque to a load connected to output shaft 16, the swashplate 22 is pivoted in the clockwise direction by jointly shifting the axial positions of spherical bearings 86 and 102 rightward, and the rotational axis of the swashplate precesses to a new setting. With the input face 110 of swashplate 22 now at an oblique angle relative to output shaft axis 25, rotation of the pump cylinder block 88 is now about a precessed axis angularly offset form output shaft axis 25. Note that the rotational axis of motor cylinder block 100 also precesses to a new setting dictated by the swashplate output face 112. The pump cylinders 90 thus reciprocate axially with respect to pump pistons 76, thereby pressurizing the hydraulic fluid in the pump cylinders and pumping the pressurized fluid through the pump cylinder openings 115, kidney-shaped slots 114 (FIG. 3), and motor cylinder openings 116. The torque exerted on the input face 110 of swashplate 22 by the rotating face of pump cylinder block 88 constitutes a mechanical component of the input torque delivered to output shaft 16 via the swashplate. This mechanical torque component is essentially zero when the input face 110 of the swashplate is perpendicular to the output shaft axis 25 and gradually increases to 100% of the output torque when the output face 112 of the swashplate is perpendicular to axis 25. This is because, with the output face of the swashplate perpendicular to the output shaft axis, there is no pumping action of the motor pistons 92 in motor cylinders 104, and thus no fluid output from motor unit 20. Consequently pump unit 18 and swashplate 22 are essentially locked up hydraulically with no relative movement between the rotating pump cylinder block 88 and swashplate 22. Therefore, the transmission ratio is 1:1 with a straight through mechanical transmission of torque from the input shaft 14 to the output shaft 16.

At intermediate angles of the swashplate 22, the hydraulic fluid pressurized by pump unit 18 is pumped through pump cylinder openings 115, the kidney-shaped slots 114 in the swashplate, and motor cylinder openings 116 to pressurize the hydraulic fluid in motor cylinders 104 of motor cylinder block 100. The pressurized fluid in motor cylinders 104 exerts an axial force against the inner, axially facing surfaces of the motor cylinder block 100, which is in turn exerted on the output face 112 of swashplate 22. A torque component is thus imparted to the swashplate which is approximately equal to the tangent of the angle of the swashplate relative to the output shaft axis times the axial force exerted by motor cylinder block 100 on the swashplate 22.

A third component of torque exerted on the swashplate 22 is a pure hydrostatic component and is a function of the differential force created by the hydraulic pressure exerted on the circumferentially opposed end surfaces of the slots 114 (FIG. 3), which, as noted above, are of different areas. This third torque component constitutes about 85% of the torque transmitted through transmission 10 at intermediate transmission ratios between neutral and 1:1.

It will be appreciated that, at transmission ratios other than neutral, while the pump cylinders 90 are revolving in the "uphill" direction from the thinnest point of swashplate 22 to the thickest point, hydraulic fluid in these cylinders is being pressurized. Consequently, this is the pumping or high pressure side of the swashplate, as noted earlier. Then, on the diametrically opposite side of the swashplate, pump cylinders 90 rotate in the "downhill" direction from the thickest point of the swashplate to the thinnest point. This then is the suction or low pressure side of the swashplate 22, during which hydraulic fluid is transferred back to the pump cylinders 90 from the motor cylinders 104.

Turning to the hydraulic circuit of FIG. 10, hydraulic fluid is pumped from sump 44 by scavenge pump 42 through a filter 230 and a fluid line 232 to housing port 220 to introduce low pressure makeup hydraulic to fluid pump unit 18 and the motor unit 20. An energy storage accumulator 234 is charged by the scavenge pump output from filter 230 through a fluid line 236 and a charging valve, generally indicated at 238. This charging valve includes a check valve 240 which opens to feed hydraulic fluid into accumulator 234, unless the accumulator pressure exceeds the pump output pressure. In this case, an adjustable pressure relief valve 242 opens and hydraulic fluid in line 236 is diverted to a return fluid line 244 leading back to sump 44 through a second pressure relief valve 246 and a cooler 248. Pressure relief valve 246 acts to reduce the pressure in fluid line 236, when diverted to fluid line 244, to allow scavenge pump 42 to run at low pressure and feed internal lubrication passages (not shown) via fluid line 232.

Accumulator 234 serves the purpose of storing energy to ensure that adequate hydraulic pressure is always available to change transmission ratio in the absence of adequate hydraulic fluid pressure at the output of scavenge pump 42. Thus, accumulator 234 is connected through a fluid line 250 and a check valve 252 to port 220. Hydraulic pressure is thus available to change transmission ratio in case the prime mover ceases to apply input torque to input shaft 14. As a transmission protective measure, a pressure relief valve 254 (not shown in FIG. 1) is incorporated in swashplate 22 between the high and low pressure sides of the swashplate in the manner disclosed in my cited PCT application to prevent the pressure differential between the high and low pressure sides of the swashplate from exceeding design limits. While not shown, it will be appreciated that the transmission hydraulic circuit may also include an accumulator for the storage of high pressure energy for subsequent recovery to drive the input shaft and/or the output shaft in the manner described in my cited copending application Ser. No. 08/333,688.

Reference numerals 86 and 130 in FIG. 10 represent the like-referenced spherical bearing and annular chamber, respectively, in FIGS. 1 and 2. Similarly, reference numerals 102 and 132 schematically represent the like-referenced spherical bearing and annular chamber in FIGS. 1 and 2. Line 260 in FIG. 10 represents the fluid connection of chamber 130 to the low pressure side of pump unit 18. Still referring to FIG. 10, a ratio changing control valve 262 includes an output connected by a fluid line 264 to housing port 208, which, as described above, is in fluid connection with annular chamber 132, as represented by line 266. Control valve 262 includes as one input, a return fluid line 268 leading back to sump 44 through cooler 248 and thus is at atmospheric pressure. A second control valve input is a low pressure fluid input from housing port 220 via fluid line 270, while the third input is a high pressure fluid input from housing port 216 via fluid line 272.

In operation, to set a desired transmission ratio (swashplate angle) control valve 262 is in the position illustrated in FIG. 10 with low pressure housing port 220 in fluid communication with chamber 132, as indicated by solid line arrow 262a. Since the low fluid pressure at housing port 220 is essentially equal to the fluid pressure in the low pressure side of pump unit 18 to which the fluid in chamber 130 is pressurized, the fluid pressures in the two chambers are equal. Consequently, the axial positions of the spherical bearings are held steady to maintain a particular swashplate angle. Note that the axial forces on the spherical bearings 86 and 102 are in opposite directions to appropriately press the faces of the pump cylinder block 88 and the motor cylinder block 100 against the input face 110 and the output face 112 of swashplate 22.

When it is desired to decrease transmission ratio (pivot swashplate 22 in the counterclockwise direction), control valve 262 is positioned to place chamber 132 in fluid flow communication with high pressure housing port 216, as indicated by dash arrow 262b. The fluid pressure in chamber 132 quickly exceeds the fluid pressure in chamber 130, and the volume of chamber 132 expands, as the volume of chamber 130 contracts. The spherical bearings 86 and 102 are thus shifted leftward to pivot swashplate 22 in the counterclockwise direction, as viewed in FIGS. 1 and 2. When the desired swashplate angle is achieved (lower transmission ratio), control valve 262 is repositioned to place chamber 132 in fluid communication with low pressure housing port 220 (solid arrow position 262a), and a balance in the fluid pressures in chambers 130 and 132 is reestablished to hold the leftward shifted spherical bearing axial positions and thus set the lower transmission ratio.

When it is desired to increase transmission ratio (pivot swashplate in the clockwise direction), control valve 262 is positioned to vent chamber 132 to atmospheric pressure via fluid line 268, as represented by dashed arrow 262c. As a result, the fluid pressure in chamber 130 exceeds the fluid pressure in chamber 132. The volume of chamber 130 expands, as the volume of chamber 132 contracts, and the spherical bearings are axially shifted rightward to pivot swashplate 22 in the clockwise direction. Again, when the desired higher transmission ratio is achieved, control valve is repositioned to place chamber in fluid communication with housing port 220, thereby reestablishing a fluid pressure balance in chambers 130 and 132 to set the higher transmission ratio.

From the foregoing description, it is seen that the present invention provides an infinitely variable hydrostatic transmission of the type disclosed in my cited U.S. application that affords advantages of compact size, fewer parts and reduced manufacturing costs. Involving the spherical bearings in the ratio controller design provides a highly efficient and effective approach to changing swashplate angle.

It will be apparent to those skilled in the art that various modifications and variations can be made to the apparatus of the present invention without departing from the spirit of the invention. Thus it is intended that the present invention cover modifications and variations thereof, provided they come within the spirit of the appended claims and their equivalence.

I claim:

1. A continuously variable hydrostatic transmission comprising, in combination:

a housing;

an input shaft journaled in the housing to receive torque from a prime mover;

a pump unit including a first carrier driven by the input shaft and mounting an annular array of pump pistons, and a first cylinder block providing an annular array of pump cylinders for respectively receiving the pump pistons;

a motor unit including a second carrier fixed to the housing and mounting an annular array of motor pistons, and a second cylinder block providing an annular array of motor cylinders for respectively receiving the motor pistons;

an output shaft journaled in the housing and adapted for driving connection to a load;

an annular swashplate surrounding the output shaft and having an input face and an output face arranged at an acute angle relative to each other, the input face confronting the first cylinder block and the output face confronting the second cylinder block, the swashplate further including slots accommodating pumped fluid flow between the pump cylinders and the motor cylinders through openings in the first and second cylinder blocks;

a connector pivotally coupling the swashplate to the output shaft in torque-coupled relation; and a ratio controller selectively exerting coordinated axial forces on the first and second cylinder blocks to adjustably set an angle of the swashplate relative to an axis of the output shaft according to a desired speed ratio between the input and output shafts.

2. The transmission defined in claim 1, wherein the pump unit further includes a first spherical bearing mounting the first cylinder block relative to the first carrier and the motor unit further includes a second spherical bearing mounting the second cylinder block relative to the second carrier, and the ratio controller includes a fluid circuit communicating with the first and second spherical bearings for exerting hydraulic forces to adjustably set axial positions of the first and second spherical bearings relative to the output shaft and thereby exert the coordinated forces on the first and second cylinder blocks.

3. The transmission defined in claim 1, wherein the connector includes a hub fixed on the output shaft and an arm extending radially from said hub and having a free end pivotally connected to the swashplate.

4. The transmission defined in claim 3, wherein the connector further includes a pin oriented transversely to the output shaft axis and pivotally interconnecting the arm free end and the swashplate.

5. The transmission defined in claim 4, wherein the pin is oriented orthogonally to the output shaft axis at a position generally between the input and output faces of the swashplate.

6. The transmission defined in claim 4, wherein the position of the pin is offset from the output shaft axis by a distance approximately equal to a circle radius conforming to positions of at least one of the annular arrays of pump and motor cylinders.

7. The transmission defined in claim 2, wherein the first spherical bearing is mounted by the first carrier for relative sliding axial motion, the first spherical bearing and the first carrier configured to define a first annular chamber having a volume determined by an axial position of the first spherical bearing; and the second spherical bearing is mounted on the second carrier for relative sliding axial motion, the second spherical bearing and the second carrier being configured to define a second annular chamber having a volume defined by an axial position of the second spherical bearing, the ratio controller operating to control relative fluid pressures in the first and second chambers to change the volumes thereof and thereby adjust the axial positions of the first and second spherical bearings incident to exerting the coordinated axial force on the first and second cylinder blocks.

8. The transmission defined in claim 7, wherein the ratio control includes:

a first fluid circuit continuously connecting the first chamber to a low pressure side of the pump unit for maintaining the fluid pressure in the first chamber at a control fluid pressure;

a second fluid circuit continuously communicating with a low pressure side of the motor unit;

a third fluid circuit continuously communicating with a high pressure side of the motor unit;

a fourth fluid circuit connected with the second chamber; and a control valve operable to connect the fourth fluid circuit to the second fluid circuit, for creating a fluid pressure in the second chamber balancing the control fluid pressure in the first chamber and thereby maintaining the axial positions of the first and second spherical bearings, connect the fourth fluid circuit to the third fluid circuit, for creating a fluid pressure in the second chamber greater than the control fluid pressure in the first chamber and thereby expanding the volume of the second chamber, while contracting the volume of the first chamber, to jointly shift the axial positions of the first and second spherical bearings in the first direction, and vent the fourth fluid circuit to a low pressure less than the control pressure, for contracting the volume of the second chamber, while expanding the volume of the first chamber, to jointly shift the axial positions of the first and second spherical bearings in a second direction opposite to the first direction.

9. The transmission defined in claim 8, wherein the pump unit includes first posts mounting the pump pistons to the first carrier, the first posts having bores included in the first fluid circuit to provide fluid communication between the pump cylinders in the low pressure side of the pump unit and the first chamber.

10. The transmission defined in claim 9, wherein the motor unit includes second posts mounting the motor pistons to the second carrier, the second posts having bores, separate pluralities of the second post bores included in the second and third fluid circuits to provide respective fluid communication between the motor cylinders in the low and high pressure sides of the motor unit and the control valve.

11. The transmission defined in claim 9, wherein the first fluid circuit includes a first portplate positioned between radial flange portions of the input shaft and the first carrier, the first portplate fixed to the input shaft and including a first port in fluid communication with the first post bores in the low pressure side of the pump unit and a second port in fluid communication with the first post bores in a high pressure side of the pump unit, and a shuttle valve, in fluid connection between the first and second ports, operating to continuously connect the first chamber in fluid communication with the low pressure side of the pump unit.

12. The transmission defined in claim 11, wherein the motor unit includes second posts mounting the motor pistons to the second carrier, the second posts having bores, separate pluralities of the second post bores included in the second and third fluid circuits to provide respective fluid communication between the motor cylinders in the low and high pressure sides of the motor unit and the control valve.

13. The transmission defined in claim 12, which further includes:

an annular manifold block positioned between radial flange portions of the second carrier and the output shaft, the manifold block fixed to the housing and including a plurality of axial through-holes in respective fluid communication with the second post bores, a first annular cavity, and a second annular cavity;

a second portplate positioned between the manifold block and the output shaft flange portion, the second portplate fixed to the output shaft flange portion and having a first port included in the second fluid circuit to provide fluid communication between the motor cylinders in the low pressure side of the motor unit and the first cavity, and having a second port included in the third fluid circuit to provide fluid communication between the motor cylinders in the high pressure side of the motor unit and the second cavity;

a first housing port in fluid communication with the first cavity and connected to the control valve;

a second housing port in fluid communication with the second cavity and connected to the control valve; and a third housing port in fluid communication with the second chamber through a first radial surface groove in the manifold block and an axial hole in the second carrier, the third housing port connected to the control valve.

14. The transmission defined in claim 13, wherein the second cavity is provided in a radial inner portion of the manifold block, the fluid communication between the second housing port and the second cavity provided by a second radial surface groove in the manifold block.

15. A continuously variable hydrostatic transmission comprising, in combination:

a housing;

an input shaft journaled in the housing to receive torque from a prime mover;

a pump unit including a first carrier, driven by the input shaft and mounting an annular array of pump pistons, and a first cylinder black providing an annular array of pump cylinders for respectively receiving the pump pistons;

a motor unit including a second carrier, fixed to the housing and mounting an annular array of motor pistons, and a second cylinder block providing an annular array of motor cylinders for respectively receiving the motor pistons;

an output shaft journaled in the housing and adapted for driving connection to a load;

an annular swashplate surrounding the output shaft and having an input face and an output face arranged at an acute angle relative to each other, the input face confronting the first cylinder block and the output face confronting the second cylinder block, the swashplate further including slots accommodating pumped fluid flow between the pump cylinders and the motor cylinders through openings in the first and second cylinder blocks;

a connector pivotally coupling the swashplate to the output shaft in torque-coupled relation;

a ratio controller for adjustably setting an angle of the swashplate relative to an axis of the output shaft according to a desired speed ratio between the input and output shafts; and an annular manifold block and an annular portplate positioned in juxtaposed relation between radial flange portions of the second carrier and the output shaft, the manifold block fixed to the housing, and the portplate fixed to the output shaft and including first and second ports, the manifold block including:

axial through-holes in respective fluid communication with the motor cylinders through holes in posts mounting the pump pistons and the first and second portplate slots;

a first annular cavity in fluid communication with the first portplate slot and those of the motor cylinders in a low pressure side of the motor unit; and a second annular cavity in fluid communication with the second portplate slot and those of the motor cylinders in a high pressure side of the motor unit, at least one of the first and second cavities connected in a hydraulic fluid circuit with the ratio controller.

16. The transmission defined in claim 15, which further includes a scavenge pump connected in the hydraulic fluid circuit to supply low pressure makeup hydraulic fluid to the first annular cavity.

17. The transmission defined in claim 16, wherein a radial interface between the manifold block and the portplate provides a hydraulic thrust bearing for counterbalancing axial thrust loading of the transmission appearing at the radial interface.

18. The transmission defined in claim 16, wherein the pump unit further includes a first spherical bearing mounting mounting the first cylinder block relative to the first carrier, and the motor unit further includes a second spherical bearing mounting the second cylinder block relative to the second carrier, the ratio controller operatively connected to jointly shift axial positions of the first and second spherical bearings, whereby to exert forces on the swashplate via the first and second cylinder blocks to change the swashplate angle.

19. The transmission defined in claim 15, wherein the connector includes a hub fixed on the output shaft and an arm extending radially from the hub and having a free end pivotally connected to the swashplate at a pivot axis oriented transversely to the output shaft axis, the pivot axis being radially offset from the output shaft axis by a distance approximately equal to a circle radius conforming to positions of the annular arrays of pump and motor cylinders.

20. A continuously variable hydrostatic transmission comprising, in combination:

a housing;

an input shaft journaled in the housing to receive torque from a prime mover;

a pump unit including a first carrier, driven by the input shaft and mounting an annular array of pump pistons, and a first cylinder black providing an annular array of pump cylinders for respectively receiving the pump pistons;

a motor unit including a second carrier, fixed to the housing and mounting an annular array of motor pistons, and a second cylinder block providing an annular array of motor cylinders for respectively receiving the motor pistons;

an output shaft journaled in the housing and adapted for driving connection to a load;

an annular swashplate surrounding the output shaft and having an input face and an output face arranged at an acute angle relative to each other, the input face confronting the first cylinder block and the output face confronting the second cylinder block, the swashplate further including slots accommodating pumped fluid flow between the pump cylinders and the motor cylinders through openings in the first and second cylinder blocks;

a connector pivotally coupling the swashplate to the output shaft in torque-coupled relation, the connector including a hub fixed on the output shaft and an arm extending radially from the hub and having a free end pivotally connected to the swashplate at a pivot axis oriented transversely to the output shaft, the pivot axis being radially offset from the output shaft axis by a distance substantially equal to a circle radius conforming to positions of the annular arrays of pump and motor cylinders; and a ratio controller for pivoting the swashplate about the pivot axis to adjustably set an angle of the swashplate relative to an axis of the output shaft according to a desired speed ratio between the input and output shafts.

* * * * *